(12) United States Patent
Rodrigues et al.

(10) Patent No.: US 6,892,764 B2
(45) Date of Patent: May 17, 2005

(54) COLOR SHADE CHANGING UNIT MODULE FOR PAINTING INSTALLATION

(75) Inventors: Jose Rodrigues, Saint-Guillaume (FR); Xavier Laborie, Uriage (FR)

(73) Assignee: Eisenmann France Sarl (FR)

( * ) Notice: Subject to any disclaimer, the term of this patent is extended or adjusted under 35 U.S.C. 154(b) by 13 days.

(21) Appl. No.: 10/466,564

(22) PCT Filed: Jan. 17, 2002

(86) PCT No.: PCT/FR02/00187

§ 371 (c)(1), (2), (4) Date: Oct. 30, 2003

(87) PCT Pub. No.: WO02/057023

PCT Pub. Date: Jul. 25, 2002

(65) Prior Publication Data

US 2004/0074545 A1 Apr. 22, 2004

(30) Foreign Application Priority Data

Jan. 19, 2001 (FR) .............................. 01 00758

(51) Int. Cl.⁷ .............................................. F16K 11/10
(52) U.S. Cl. ...................................... 137/884; 239/124
(58) Field of Search ............................... 137/884, 563; 239/124

(56) References Cited

U.S. PATENT DOCUMENTS

| | | | |
|---|---|---|---|
| 3,373,762 A | | 3/1968 | Korchak |
| 3,403,695 A | * | 10/1968 | Hopkins ..................... 137/240 |
| 3,912,235 A | | 10/1975 | Janssen |
| 4,281,683 A | * | 8/1981 | Hetherington et al. ...... 137/606 |
| 4,830,055 A | * | 5/1989 | Kolibas ..................... 137/884 |
| 4,846,226 A | * | 7/1989 | Merritt ....................... 137/871 |
| 5,146,950 A | * | 9/1992 | Rodgers et al. ............. 137/563 |
| 6,382,220 B1 | * | 5/2002 | Kefauver ................... 134/22.1 |
| 6,619,563 B2 | * | 9/2003 | van der Steur ............. 239/125 |

FOREIGN PATENT DOCUMENTS

FR 2 777 482 10/1999

* cited by examiner

*Primary Examiner*—John Fox
(74) *Attorney, Agent, or Firm*—Cantor Colburn LLP

(57) ABSTRACT

A color shade changing unit module for a painting installation is provided including a generally parallelepiped-shaped part, a bore formed in the part, a central channel into which the bore converges, the channel being perpendicular to end faces of the module, a valve housed in the bore, the valve including a closing element, a chamber formed in the part, a paint feed channel and a paint return channel leading into the chamber and leading out onto a side face of the module generally opposite from a wall in which the bore is formed, the closing element of the valve being designed, depending on a position of the closing element, to isolate, or to connect the central channel and the paint feed and paint return channels, and also including external pipes, connectors which connect the paint feed and paint return channels to the external pipes, each such connector having an externally threaded first, smaller-diameter part designed to screw into the external pipe, and a second, larger-diameter part surrounded by at least one seal and designed to fit leaktightly into a well formed in the module, the bottom of which leads into the respective paint feed and paint return channels.

5 Claims, 2 Drawing Sheets

COLOR SHADE CHANGING UNIT MODULE FOR PAINTING INSTALLATION

TECHNICAL FIELD OF THE INVENTION

The present invention relates to a color shade changing unit module for a painting installation.

DESCRIPTION OF RELATED ART

To take the case of the painting of motor vehicles, it often happens that a manufacturer will install a painting installation capable of supplying an injection nozzle with a number of color shades that may vary from twenty to forty. However, it also often happens that after a few years it is necessary to add further color shades. In these circumstances, a color shade changing unit must be suitable for more than forty color shades.

A color shade changing unit is made up of a certain number of modules assembled together, the number of modules being a function of the number of shades to be controlled, and the number of shades being able to be increased by adding certain modules, if necessary.

In accordance with one known possibility, each module is generally parallelepiped-shaped comprising two symmetrically arranged chamfers, leading in from which are at least two bores converging toward a central channel perpendicular to the end faces of the module and also leading into this channel. Each bore acts as a housing for a valve whose closing element is designed, depending on its position, to isolate, or to connect to the central channel, a chamber into which two channels lead, a paint feed channel and a paint return channel leading to the tank, respectively. These two channels lead out onto the opposite wall of the module from that comprising the chamfers.

It must be borne in mind that the color shade changing unit must be erected as close as possible to the spray nozzle to limit the amount of paint wasted when switching from one color shade to another. The color shade changing unit must therefore be mounted at the end of the arm of a painting robot, so that its dimensions, including the paint feed and return pipes, must be as small as possible while offering excellent operational safety and allowing easy maintenance. Since each of the bores converging toward the central channel of the module communicates with one of the color shades of the general paint distribution system, the slightest "leak" from one bore to another results in irreversible mixing of several hundred liters of paint. In the same way, a leak of paint from any point in the module to the exterior can only be detected by eye. Since production machines using such color shade changing modules run automatically with as little human involvement as possible, a paint leak will only be detected very late after having caused major problems.

As indicated earlier, these color shade changing modules must be installed as close as possible to the spray nozzle, usually in the arm of the paint machine supporting the spray gun. The cross section of the arm of the machine must itself not be too great because the larger the arm, the more it will be spattered by excess paint spray. The dimensions of such a module equipped with all its hoses must therefore be kept as small as possible.

In known systems, the pipes carrying the paint to and from the tank are connected to the channels formed inside the modules via screwed connectors. These screwed connectors are bulky and a certain separation needs to be maintained between two adjacent connectors. This large separation means that the size of the color shade changing unit module must also be large.

BRIEF SUMMARY OF THE INVENTION

The invention provides a color shade changing unit module of simple structure, very compact, including after connecting up the paint feed and return pipes, that is very safe to use, and with which maintenance can be carried out simply and economically.

To this end, in the module to which the invention relates, of the aforementioned kind, each paint feed or return channel is connected to an external pipe via a connector comprising an externally threaded first, smaller-diameter part designed to screw into an external pipe and a second, larger-diameter part surrounded by at least one seal and designed to fit leaktightly into a well formed in the module, the bottom of which leads into a paint feed or return channel, and the first, smaller-diameter part of the connector is angled.

This method of connecting the feed and return pipes taking each paint to and from the tank makes it possible to reduce the size of these connections and therefore to place the channels closer together, resulting in miniaturization of the module itself.

The angled form of the connectors enables the total space requirements including the paint feed and return pipes to be limited. In addition, it should be observed that the method of connecting the pipes to the unit enables the best angular orientation to be adopted in order to benefit from reduced space requirements.

In order to clamp the connectors of the various pipes into the module, that face of the module through which the paint feed and return channels pass comprises means for clamping the larger-diameter parts of the connectors when the latter are in the engaged position in the corresponding wells.

In one embodiment, the means of clamping the connectors consist of lugs [sic] which are mounted so as to be able to pivot or slide on the face of the module through which the connectors pass, and which are each designed to bear on the outer face of the larger-diameter part of at least one connector. This connection allows the connector to retain a freedom of rotation, resulting in a better connection and better maintainability.

In accordance with another feature of the invention, the number of bores designed to house pneumatic valves is even, the bores being grouped in pairs of two converging bores, the two bores of each pair being offset axially, along the axis of the central channel, by a small distance that is less than the diameter of the bores.

The fact that the bores of each pair are offset with respect to each other means that, as well as keeping the module compact, sealing problems are avoided. Miniaturizing a module with valves immediately opposite each other could result in a thinning of the sealing zones which might result in minute paint leaks and consequently damaging mixing of shades, including in the return circuit carrying each shade back to the tank.

Advantageously, this module comprises complementary assembly means formed in its end faces, consisting of: a lug and a complementary recess, both formed in each end face in the vicinity of the two side walls of the module; and a screw passing into this recess and accessible from a chamfered surface; these various elements being arranged, on each side of the module, in such a way that each lug projects, in the vicinity of a side wall, from the nearest end face to a bore for a valve, while the complementary recess and the screw are situated near the other end face, that is to say the end face furthest from this same bore.

The offset between the two bores of one pair of bores is thus benefited from to produce an advantageous arrangement of the means of assembly between two successive modules. It should be observed that the number of bores may vary from two to eight per module.

BRIEF DESCRIPTION OF THE DRAWINGS

However, the invention will be understood more fully with the help of the following description, referring to the appended schematic drawing showing, by way of example, an embodiment of a color shade changing unit module.

DETAILED DESCRIPTION OF THE INVENTION

Figure 1:
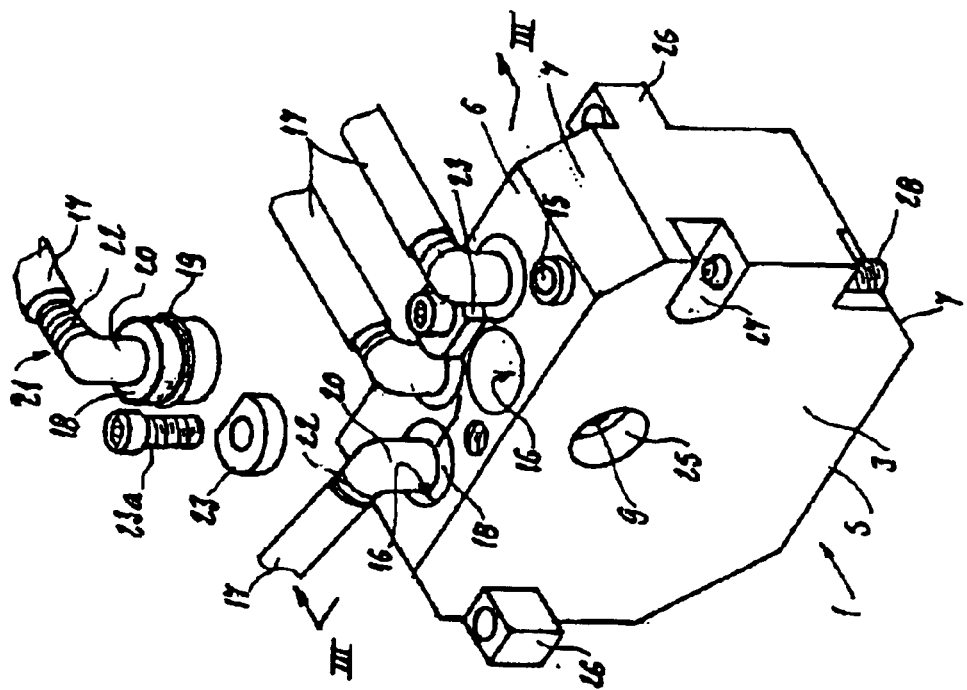
FIG. 1 is a perspective view of two identical modules before assembly, each module being designed to control two different color shades.
Figure 1:
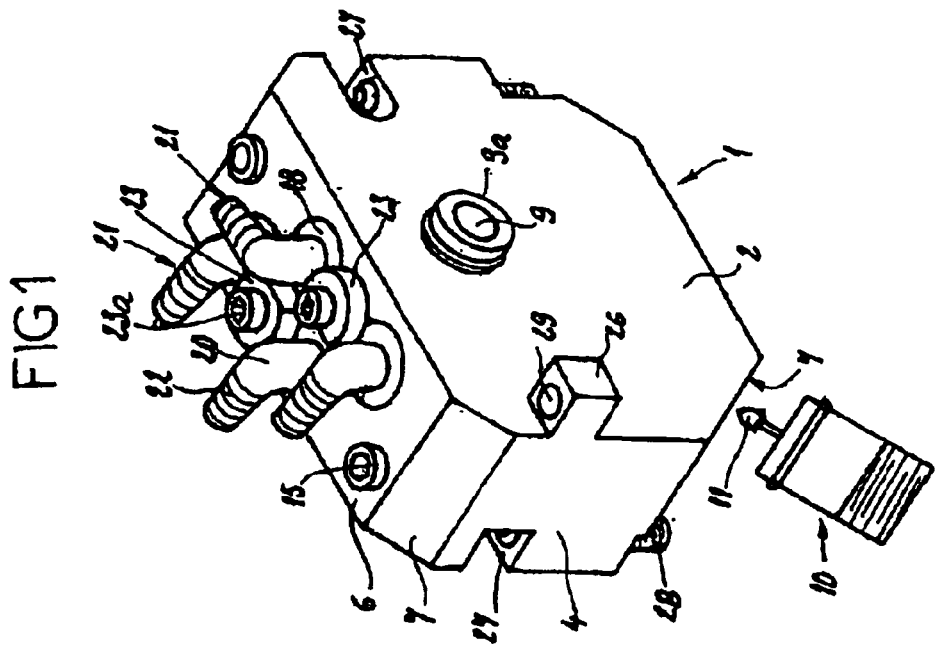

The module 1 shown in the drawing is generally parallelepiped-shaped with two end faces 2 and 3, two longitudinal faces 4, and two side faces 5 and 6. The side faces 5 and 6 each include two chamfers 7 at their two corners, these chamfers 7 forming angles of 90° to each other. Let into two of the chamfers 7 are two bores 8 which converge and lead into a central channel 9 whose function is to supply paint to an injection nozzle of a spray gun. Each bore 8 is used to house a pneumatically controlled valve 10, the needle 11 of which closes the bore 8 off from the channel 9. A number of channels 12, 13 run in from the face 6 of the module. These channels 12, 13 lead into a chamber 14 which can be connected to or disconnected from the central channel 9 depending on the position of the needle 11. The channel 12 is a paint feed channel and the channel 13 is a paint return channel leading back to the tank. This is because it is important that the paint should be kept permanently circulating to avoid any risk of sedimentation.

The valve 10 is controlled pneumatically by admission of compressed air into a channel 15 which likewise leads in from the wall 6. Each channel 12, 13 leads in from the wall 6 via a well 16 of enlarged section. Each channel 12, 13 is connected by a connector 21 to a corresponding external pipe 17 carrying paint.

Each connector 21 comprises a larger-diameter part 18 designed to fit in a well 16 of a channel 12, 13, sealing being provided by an o-ring 19. This larger-diameter part 18 is continued by a smaller-diameter part 20 possessing a screwthread 22 on which the pipe 17 is engaged. As shown in the drawing, this part 20 may be angled to give the pipe 17 the desired orientation and so save space. In view of the type of connection, it is possible to give the pipe 17 the desired orientation by pivoting the larger-diameter part 18 inside the well 16 forming its housing. In the embodiment shown in the drawing, the four connectors 21 are retained in the corresponding wells 16 by two eccentric washers 23 held in place by screwing them into the wall 6 (screw 23a).

It can be seen from this structure that, given the type of connection of the pipes 17, by means of very compact connectors 21, the pipes 12, 13 can be positioned very close together, so that a very compact module 1 can be produced.

Figure 2:
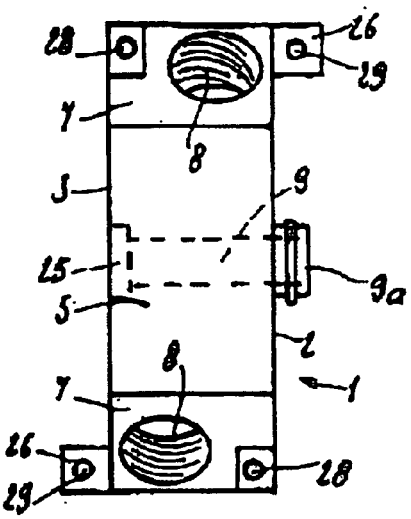
FIG. 2 is a view of one of the two modules, showing the face to which the valves are connected.
Figure 3:
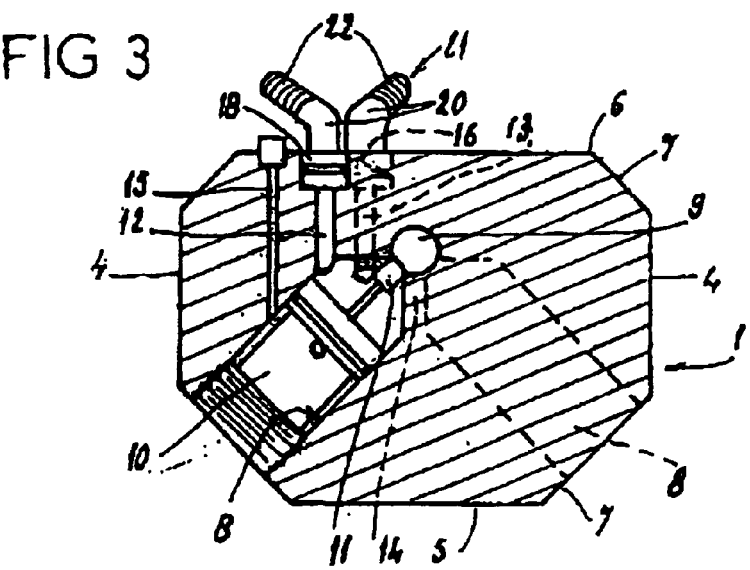
FIG. 3 is a cross-sectional view of a module taken on the line marked III—III in FIG. 1.

As can be seen in FIGS. 2 and 3 in particular, the two bores 8 acting as housings for the two valves 10 are axially offset with respect to each other, in the direction of the central channel 9. The offset is small, less than the diameter of the bore 8. This offset enables a highly compact structure to be produced, without the thickness of the material between the bores 8 being reduced excessively and endangering the leaktightness between the circuits of the different paints.

It can be seen in FIG. 1 in particular that the module 1 according to the invention can be attached easily and quickly to similar modules 1. For this purpose, the central channel 9 leads out onto the end face 2, where there is an element 9a projecting from the face 2 that can fit into a recess 25 in the face 3 of an adjacent module 1. In addition, each module 1 is provided on each of its faces 2 and 3 with a lug 26 and a recess 27, the lugs 26 and the recesses 27 being reversed on the two faces 2 and 3 in such a way that the lug 26 of one module 1 can be engaged in a recess 27 in the adjacent module 1. On each end face 2, 3, the lugs 26 are positioned on the side where the bore 8 is nearest to the face 2 or 3 in question. For any given side, the recesses 27 are formed in the opposite face, and are each provided with a screw 28 designed to pass through the recess 27 and engage in a hole 29 formed in a lug 26. Connecting two modules 1 together is therefore performed simply and quickly by juxtaposing these modules and tightening two screws 28.

Figure 4:
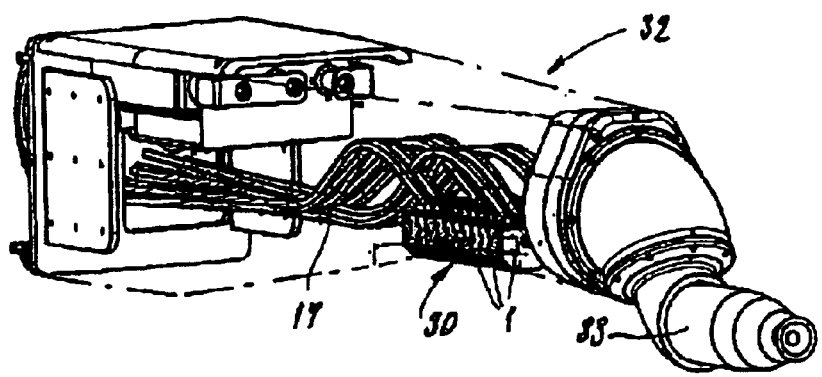
FIG. 4 is a view of a set of color shade changing modules mounted in the arm of a paint application machine.

FIG. 4 shows a color shade changing unit 30 comprising modules according to the invention mounted in an arm 32 of a paint application machine, with spray gun 33. This figure shows clearly the advantages provided by the invention, which allows a large number of pipes 17 to be housed and connected up in a compact volume.

As will be clear from the above, the invention greatly improves on the existing technology by providing a module 1 for a color shade changing unit 30 that is of a simple structure, is very compact in itself, and also enables the collection of pipes 17 with which it is provided to be made very compact, and simple to maintain, because one pipe 17 can be disconnected very quickly from the module 1.

It will be observed that this module 1 could have a different number of pairs of bores 8 for containing valves 10, for example four, six or eight bores, without thereby departing from the scope of the invention as defined in the appended claims.

What is claimed is:

1. A color shade changing unit module for a painting installation, comprising:
   a generally parallelepiped-shaped part;
   a bore formed in the part;
   a central channel into which the bore converges, the channel being perpendicular to end faces of the module;
   a valve housed in the bore, the valve including a closing element
   a chamber formed in the part;
   a paint feed channel and a paint return channel leading into the chamber, and leading out onto a side face of the module generally opposite from a wall in which the bores is formed, the closing element of the valve being designed, depending on a position of the closing element, to isolate, or to connect the central channel and the paint feed and paint return channels;

external pipes;

connectors which connect the paint feed and paint return channels to the external pipes, each connector comprising:

an externally threaded first, smaller-diameter part designed to screw into the external pipe; and a second, larger-diameter part surrounded by at least one seal and designed to fit leaktightly into a well formed in the module, the bottom of which leads into the respective paint feed and paint return channels;

wherein the smaller-diameter part of the connector is angled.

2. The module as claimed in claim 1, wherein the side face of the module through which the paint feed and paint return channels pass comprises means for clamping the larger-diameter parts of the connectors when the connectors are in the engaged position in the corresponding wells.

3. The module as claimed in claim 2, wherein the means of clamping the connectors comprise lugs which are mounted to pivot or slide on the side face of the module through which the connectors pass, and wherein each lug is designed to bear on an outer face of the larger-diameter part of at least one of the connectors.

4. The module as claimed in claim 1, wherein the bore further comprises a plurality of bores, the number of bores designed to house the valves is even, the bores being grouped in pairs of two converging bores, the two bores of each pair being offset axially along an axis of the central channel by a small distance that is less than a diameter of the bores.

5. The module as claimed in claim 4, further comprising complementary assembly means formed in the end faces of the module including—a lug and a complementary recess, both formed in each of the end faces in the vicinity of side walls of the module and a screw passing into the recess and accessible from a chamfered surface, wherein each lug projects, in the vicinity of one of the side walls, from the nearest end to one of the bores, while the complementary recess and the screw are situated near the other end face furthest from the bore.

* * * * *